United States Patent [19]
Nishigaki et al.

[11] Patent Number: 5,377,357
[45] Date of Patent: Dec. 27, 1994

[54] CONNECTION STATE CONFIRMATION SYSTEM AND METHOD FOR EXPANSION UNIT

[75] Inventors: Nobutaka Nishigaki; Koji Nakamura; Mayumi Maeda, all of Tokyo, Japan

[73] Assignee: Kabushiki Kaisha Toshiba, Kawasaki, Japan

[21] Appl. No.: 708,730

[22] Filed: May 31, 1991

[30] Foreign Application Priority Data

| Aug. 20, 1990 | [JP] | Japan | 2-218604 |
| Oct. 16, 1990 | [JP] | Japan | 2-277102 |
| Oct. 19, 1990 | [JP] | Japan | 2-278911 |

[51] Int. Cl.$^5$ .............................. G06F 1/30
[52] U.S. Cl. .................. 395/800; 364/285.1; 364/280.2; 364/280.3; 364/237.2; 364/DIG. 1; 395/575
[58] Field of Search .......... 395/800, 275, 575

[56] References Cited

U.S. PATENT DOCUMENTS

| 3,898,636 | 8/1975 | Smith | 340/225 |
| 3,959,775 | 5/1976 | Valassis | 395/325 |
| 4,145,739 | 3/1979 | Dunning | 395/800 |
| 4,214,305 | 7/1980 | Tokita | 395/325 |
| 4,403,303 | 9/1983 | Howes | 395/500 |
| 4,504,927 | 3/1985 | Callan | 395/275 |
| 4,570,220 | 2/1986 | Tetrick | 395/325 |
| 4,591,981 | 5/1985 | Kassabov | 395/800 |
| 4,710,893 | 12/1987 | McCutcheon | 395/325 |
| 4,750,136 | 6/1988 | Arpin | 364/514 |
| 5,140,693 | 8/1992 | Ninomiya | 395/775 |
| 5,218,607 | 6/1993 | Saito | 371/66 |
| 5,299,322 | 3/1994 | Arai | 395/275 |

FOREIGN PATENT DOCUMENTS

| 0364115 | 4/1890 | European Pat. Off. . |
| 0116694 | 8/1984 | European Pat. Off. . |
| WO88/10468 | 12/1988 | WIPO . |

*Primary Examiner*—Eric Coleman
*Attorney, Agent, or Firm*—Oblon, Spivak, McClelland, Maier & Neustadt

[57] ABSTRACT

An expansion unit has a connector for docking a portable computer. A value of a specific pin of the connector is set in a connection identification register arranged in the expansion unit. When the portable computer is started, it reads the content of the identification register, and checks if a resume mode is set. When it is determined that the expansion unit is connected, and the resume mode is set, a message indicating that the expansion unit is connected is displayed on a display device for a predetermined period of time.

22 Claims, 12 Drawing Sheets

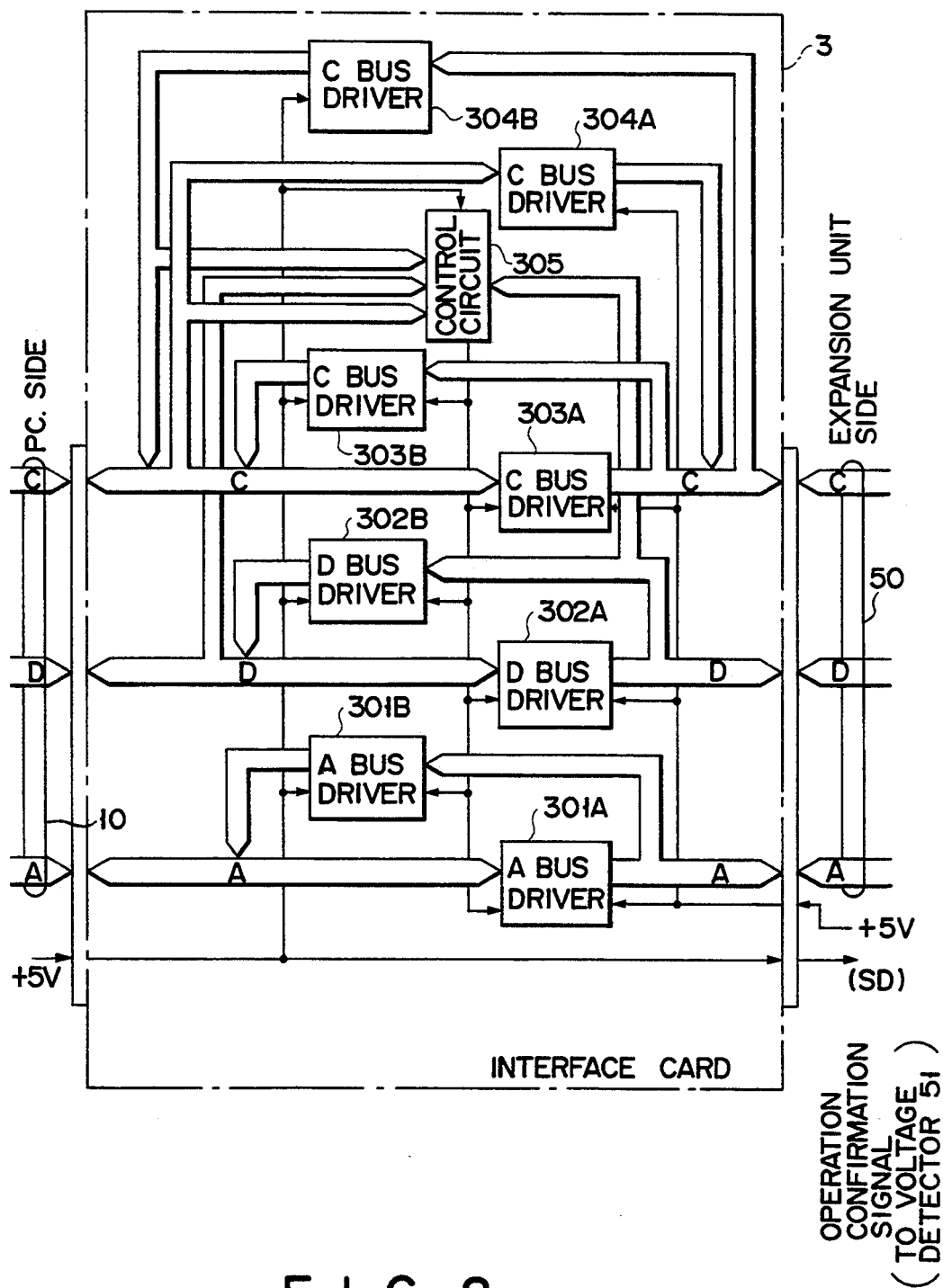
F I G. 2

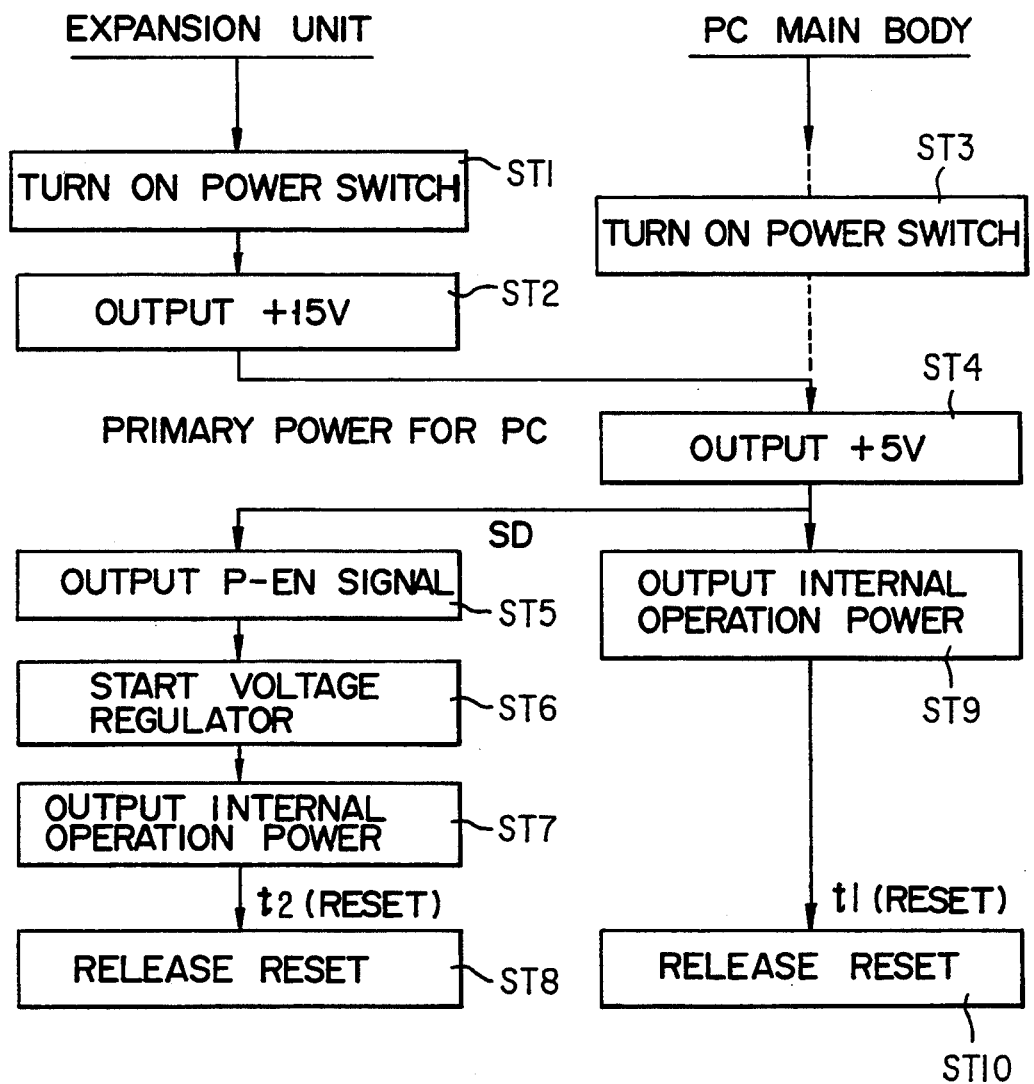
F I G. 4

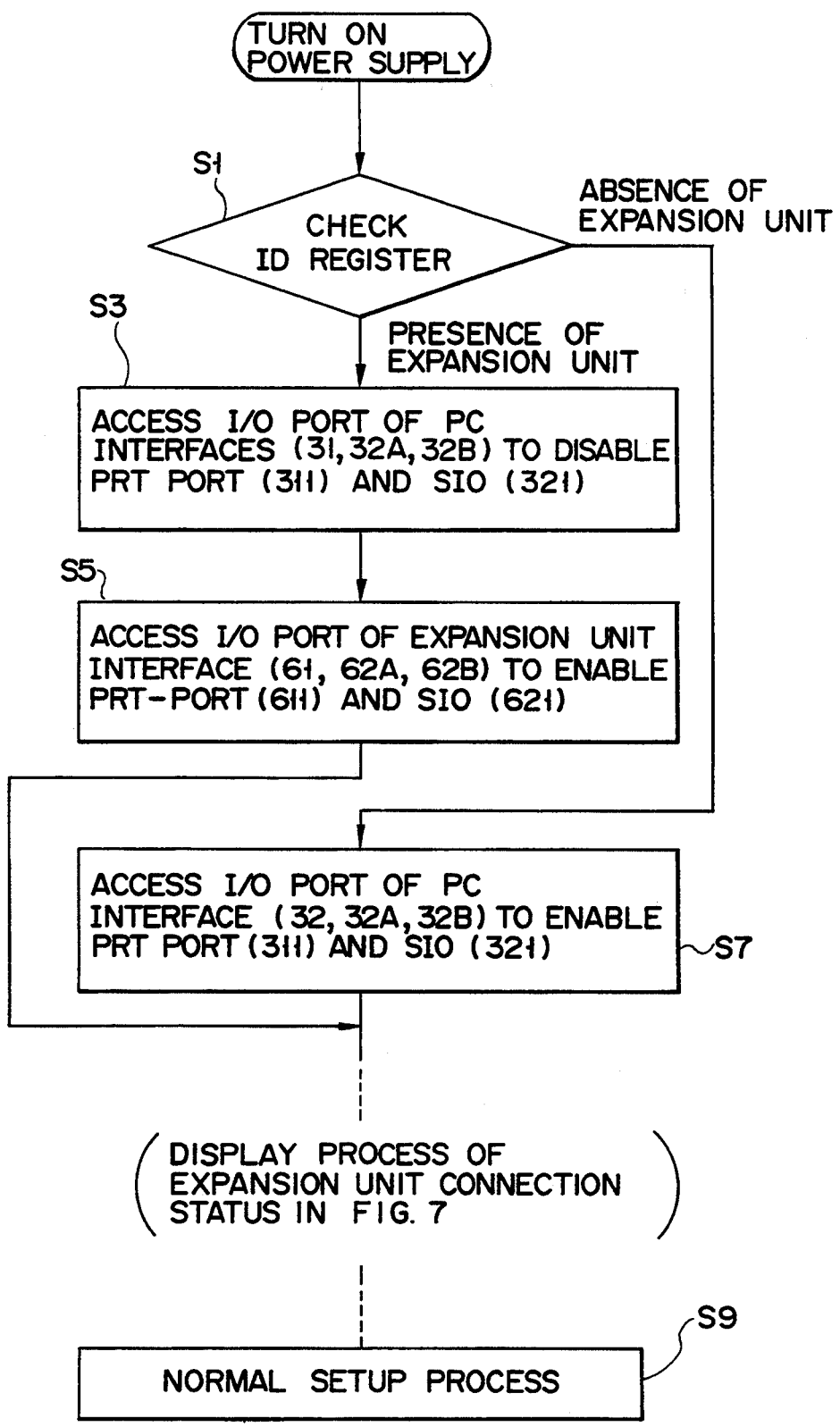
F I G. 6

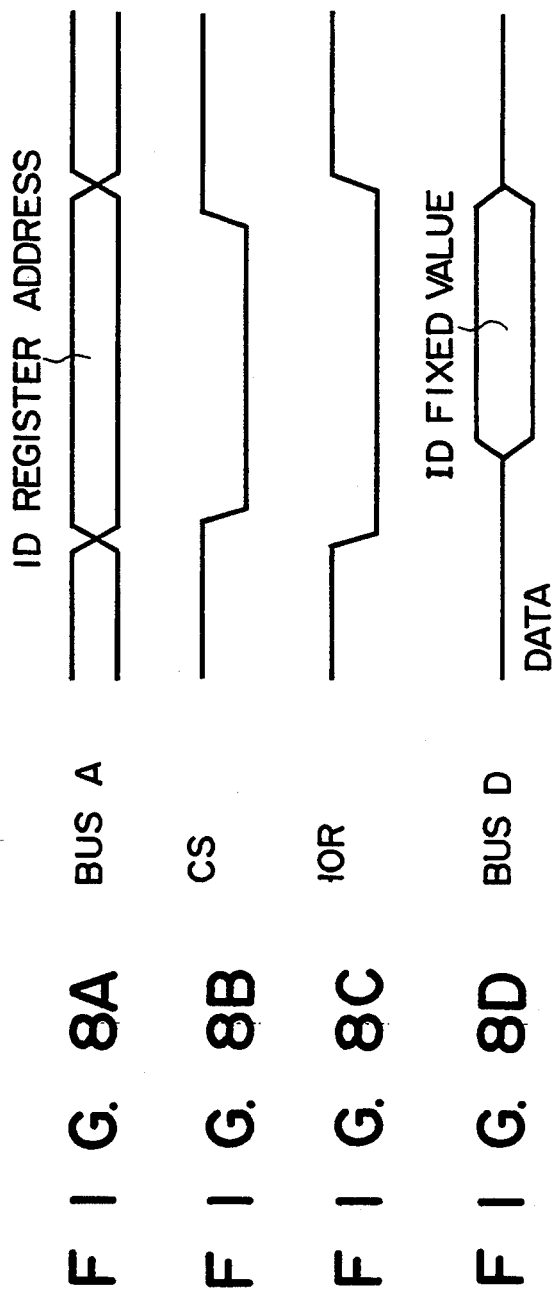

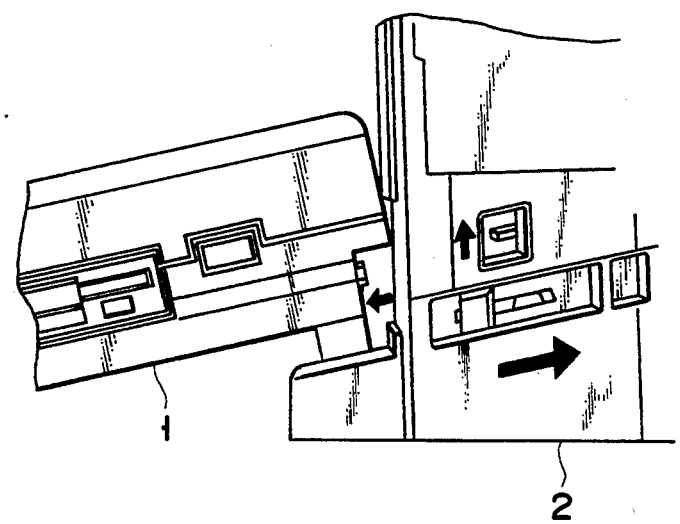
F I G. 9B
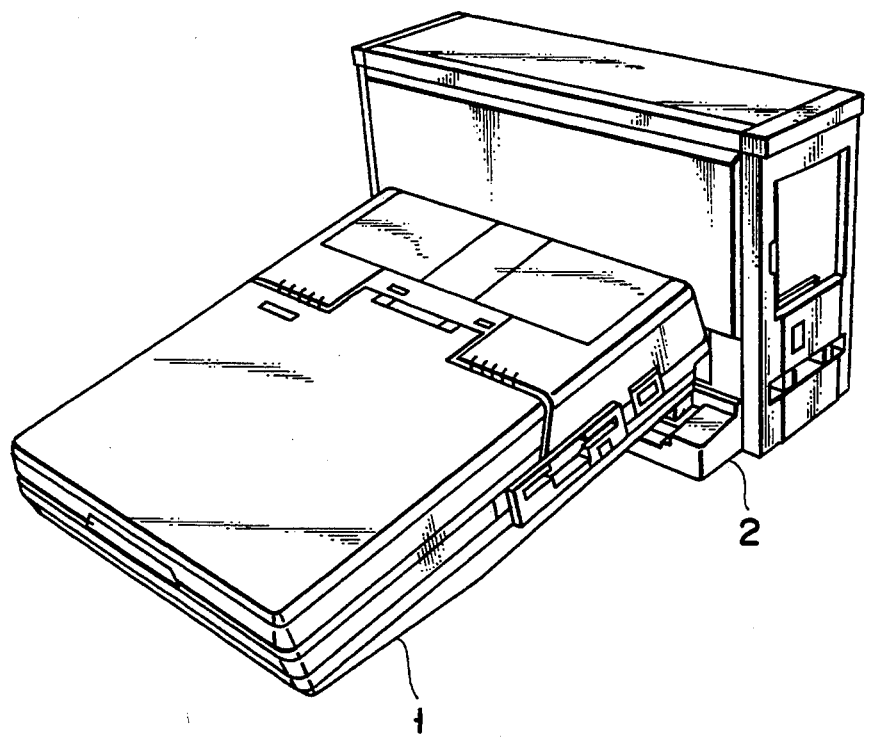
F I G. 9C

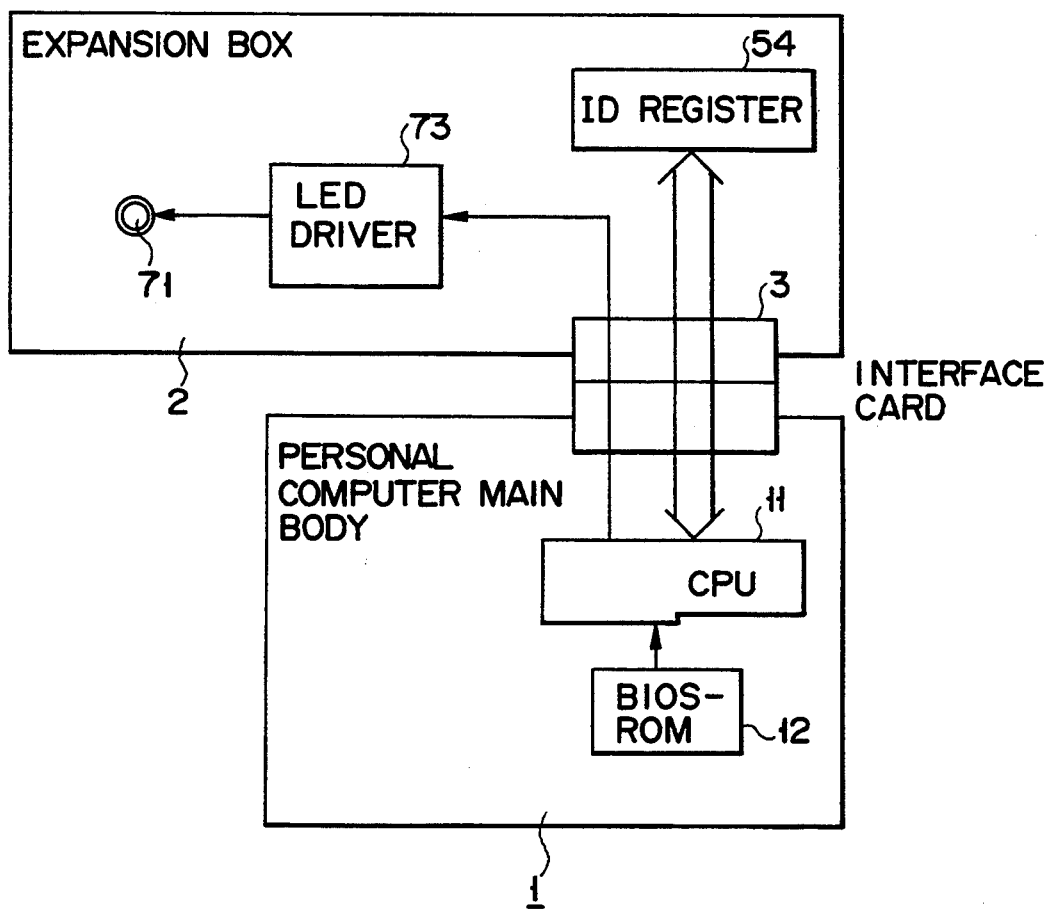
F I G. 10

CONNECTION STATE CONFIRMATION SYSTEM AND METHOD FOR EXPANSION UNIT

BACKGROUND OF THE INVENTION

1. Field of the Invention

The present invention relates to a connection confirmation system and method for an expansion unit used in a computer, which can be connected to the expansion unit via, e.g., an expansion bus connector, and has a resume function.

2. Description of the Related Art

In a conventional lap-top type compact portable computer having a port capable of connecting an expansion unit, an interface connection between the computer and the expansion unit is attained using a specific cable having connectors at its two ends.

In this case, whether or not a cable is normally connected is visually checked.

However, a connection confirmation means of the expansion unit is not reliable since confirmation operations of a power supply state and a connector coupling state of the expansion unit are further required.

In recent years, in order to expand functions of a lap-top type compact portable computer, an expansion unit having a mechanism which fixes and docks the portable computer at a predetermined position in a usable state, and is bus-connected to an expansion bus connector of the computer, has been proposed. In this case, an operator must recognize based on an indication whether or not the expansion unit is normally connected when the power switch of the computer is turned on.

However, when the computer to be connected to the expansion unit has a resume function, the resume function may be enabled or disabled. For example, when a display card, an expansion memory card, or an HDD, (hard disk drive) card is connected to the expansion unit, the resume function is disabled. However, when a LAN card, an RS-232C card, or a printer card is connected to the expansion unit, the resume function is enabled. When the computer is started in a resume mode, an application software program is directly started, and a display screen immediately before the power-off is resumed. In a conventional system, if the expansion unit is connected when the resume mode is set, the expansion unit cannot be connected. However, in some cases, connection of the expansion unit is permitted even in the resume mode, as described above. In such a case, connection of the expansion unit is preferably informed to an operator. However, when a connection confirmation message displayed, a displayed portion of the resume screen is undesirably broken.

The U.S. application (application Ser. No. 578,533 now abandoned, filing date: Apr. 7, 1990, title of the invention: computer system capable of connecting expansion unit) by the same assignee discloses a system which comprises an expansion interface for connecting external I/O devices, and also comprises registers for storing data for enabling or disabling internal I/O devices, and a circuit for forcibly disabling chip selection of an LSI serving as a core of the I/O interface in accordance with the contents of the registers. Furthermore, the above-mentioned application discloses a power supply control system for an expansion unit having a connection port capable of detachably connecting a portable computer, which system comprises a power supply switch, a portable computer power supply circuit for supplying an operation power supply voltage to the portable computer connected to the connection port when the switch is turned on, a detection circuit for receiving a specific output signal from the portable computer connected to the connection port, and detecting that the portable computer is set in an operation enable state upon reception of the power supply voltage, and an expansion unit power supply circuit for supplying an operation power supply voltage to its own internal circuits in response to a detection signal from the detection circuit. Moreover, the application also discloses a connection control mechanism for an expansion unit, which mechanism on the expansion unit side comprises an external device connector provided to a portable computer, an interface circuit for the connector, a means for enable/disable-controlling the interface circuit, and a means for out putting device identification data, and which mechanism on the portable computer side comprises a means for enable/disable-controlling the interface circuit for the external device connector, a means for loading and recognizing the device identification data from the expansion unit, and a means for, when the device identification data is recognized, disabling the interface circuit of the external device connector, and enabling the interface circuit of the expansion unit.

In addition, the above-mentioned application discloses a portable computer system which comprises a portable computer main body, an expansion unit connected to the main body via a bus connector, a register for storing data for permitting/inhibiting use of internal I/O ports of the main body, a means for, when the expansion unit is connected to the main body, checking whether or not an address of an I/O port used by the expansion unit is present in the main body, and a means for, when the expansion unit is connected to the main body, and it is determined that the address of the I/O port used by the expansion unit is present in the main body, inhibiting use of I/O ports by the main body via the register.

SUMMARY OF THE INVENTION

It is an object of the present invention to provide a connection confirmation system and method for an expansion unit, with which a connection between a portable computer and the expansion unit can be easily confirmed even in a resume mode.

According to the first aspect of the present invention, a connection state display system for an expansion unit connected to a portable computer having resume function, comprises: recognition means for recognizing a connection state of the expansion unit when the portable computer is started; and means for, when the recognition means recognizes connection of the expansion unit, informing to a user of the portable computer that the expansion unit is connected.

According to the second aspect of the present invention, a connection state display system for an expansion unit connected to a portable computer having resume function, comprises: first recognition means for recognizing a connection state of the expansion unit when the portable computer is started; second recognition means for recognizing that the resume function is activated when the portable computer is started; means for, when the first and second recognition means recognize that the expansion unit is connected, and the resume function is activated, saving data on a specific display area of a resume screen; means for displaying a message indicating that the expansion unit is connected on the specific display area; and means for displaying the saved data on the specific display area after the message is displayed on the specific display area.

The connection confirmation system for the expansion unit of the present invention comprises a means for, when a power switch of the portable computer is turned on, detecting a connection state of the expansion unit on the basis of a content read from an identification data register provided to the expansion unit, and for, when it is determined that the expansion unit is connected, displaying a connection presence/absence state of the expansion unit. Therefore, a connection state between the portable computer and the expansion unit can be easily confirmed.

The connection confirmation system for the expansion unit according to the present invention comprises a means for, when a power switch of the portable computer is turned on, detecting a connection state of the expansion unit on the basis of a content read from an identification data register provided to the expansion unit, for detecting a setting state of a resume mode, for, when it is determined that the expansion unit is connected, and the resume mode is set, displaying a connection presence/absence state of the expansion unit on a specific display area on a display screen started in the resume mode for a predetermined period of time to be able to be distinguished from other display data, and for restoring the original display screen started in the resume mode thereafter. Therefore, the connection state between the portable computer and the expansion unit can be displayed even in the resume mode without destroying the resume screen.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a detailed block diagram of an interface card shown in FIG. 1;

FIG. 4 is a chart showing a power-on sequence when the expansion unit is used;

FIG. 6 is a flow chart of a connector switching processing routine executed when a power switch of a portable computer main body is turned on;

FIGS. 8A, 8B, 8C and 8D are timing charts showing a read timing of an ID register;

FIGS. 9A, 9B and 9C are perspective views showing outer appearances of a portable computer main body 1 and an expansion unit 2 in the embodiment; and FIG. 10 is a block diagram showing another embodiment of the present invention.

DETAILED DESCRIPTION OF THE PREFERRED EMBODIMENTS

Figure 1A:
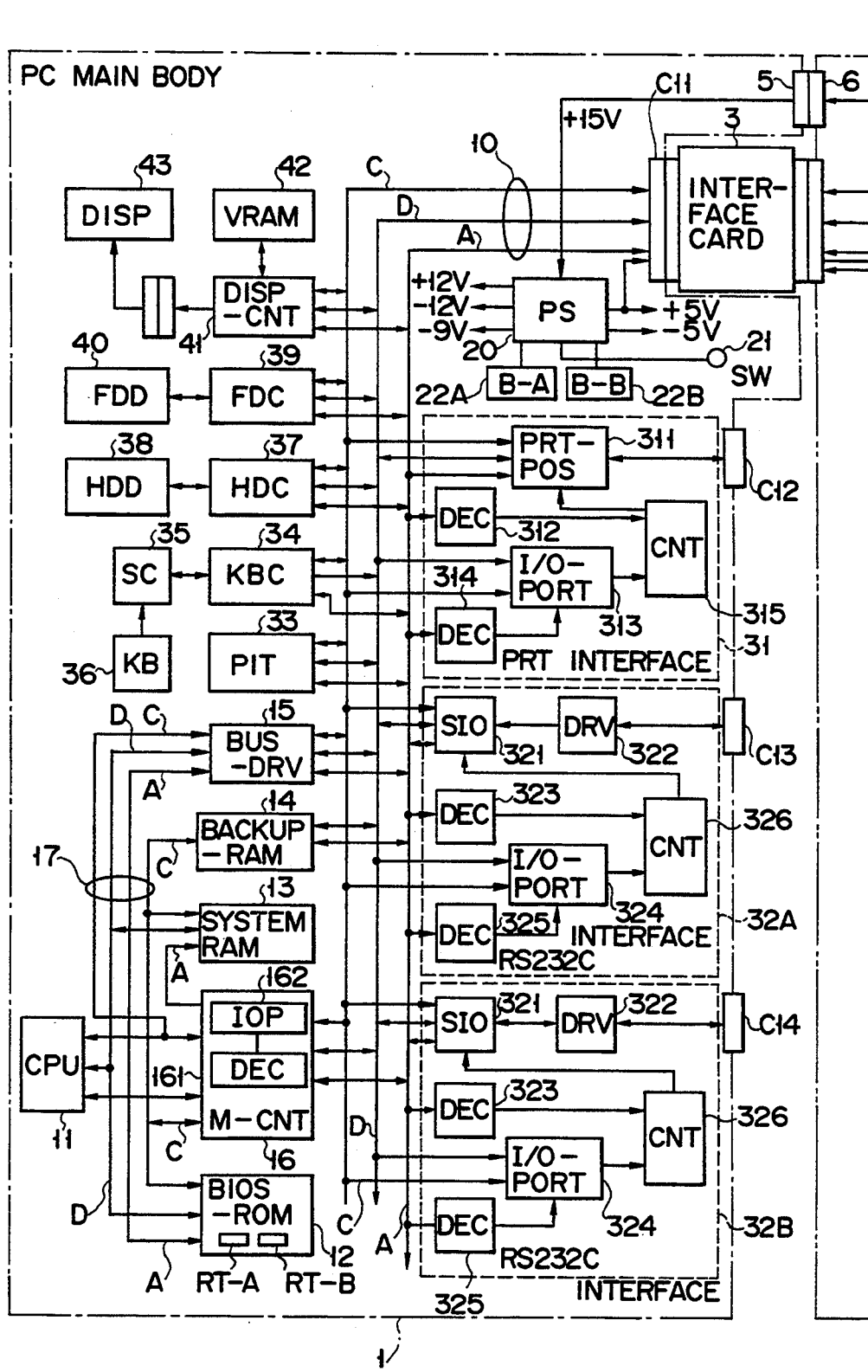
FIGS. 1A and 1B are block diagrams showing a connection confirmation system for an expansion unit according to an embodiment of the present invention.
Figure 1B:
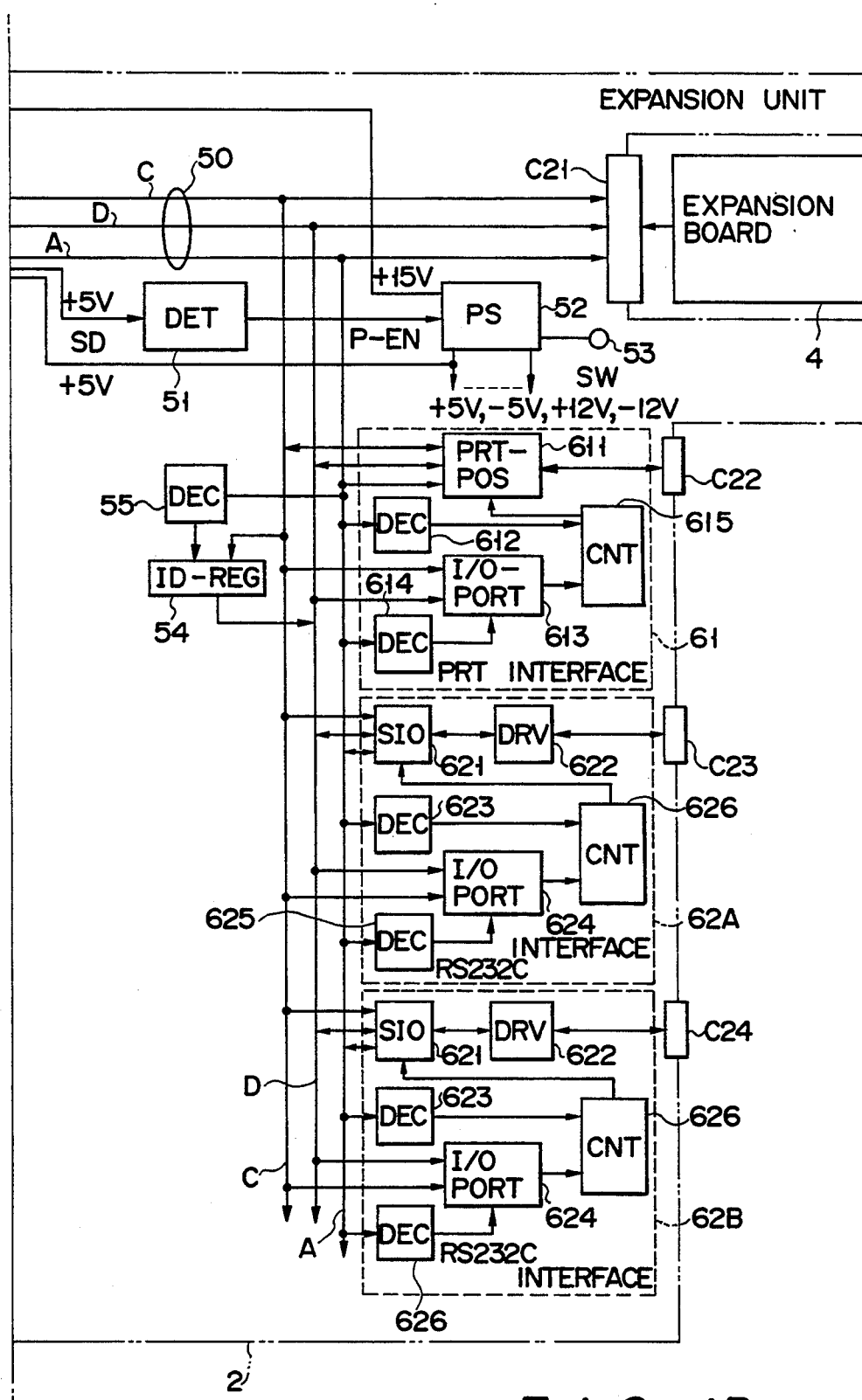

FIGS. 1A and 1B show a docking state between a personal computer 1 and an expansion unit 2. The portable computer (PC) main body 1 is of, e.g., a lap-top type which can be driven by a battery. An interface card 3 is connected to an expansion bus connector C11 of the PC main body 1 when the expansion unit 2 is used. The expansion unit 2 and the PC main body 1 are interface-connected to each other via the interface card 3. Supply sources of operation power supply voltages to bus drivers interposed in data transfer paths of the interface card 3 are roughly classified into two sources depending on directivities of the bus drivers. This will be described in detail later with reference to FIG. 2. An expansion board 4 is connected to an expansion bus connector C21 of the expansion unit 2, as needed. A power supply input terminal 5 of the PC main body 1 is applied with a DC output power supply voltage (+15 V) from a special-purpose power supply adapter as an operation primary power supply voltage when the expansion unit 2 is not used. When the expansion unit 2 is used, the input terminal 5 is plug-in connected to a PC power supply output plug 6 of the expansion unit 2, and is applied with a DC power supply voltage (+15 V) generated in the expansion unit 2 as an operation primary power supply voltage.

The PC main body 1 comprises components 10 through 43, and C11 through C14. Components 11 through 17, and 31 through 43 are connected to a system bus 10 directly or indirectly.

A CPU 11 controls the entire system. In this embodiment, the CPU 11 has a resume processing function (a function of resuming a state immediately before the power switch was turned off when the power switch is turned on again, and allowing continuous execution of a program), and a processing function of displaying a connection state of the expansion unit when the resume mode is set. In addition, the CPU 11 has a processing function of extending a connector (switching an alternative connector) to the expansion unit when the expansion unit is used. A system firmware ROM (BIOS ROM) 12 includes an external device connection state display processing routine RT-A for displaying a connection state of the expansion unit when the power switch is turned on in a state wherein the resume mode is set, a connector switching processing routine RT-B for extending a connector (switching an alternative connector) to the expansion unit side when the expansion unit is used, and the like. A RAM (SYSTEM-RAM) 13 constitutes a main memory, and stores programs, data, and the like as objects to be processed. A backup RAM 14 serves as a data storage area for realizing the resume function, and is supplied with a backup power supply voltage when the power supply is cut off. A bus driver (BUS-DRY) 15 is interposed between a CPU bus 17 and the system bus 10, and exchanges data between these buses. A memory controller (M-CNT) 16 access-controls the memories 12, 13, and 14 under the control of the CPU 11. In this embodiment, the M-CNT 16 includes an address decoder (DEC) 161 for detecting a designated address of the backup RAM 14, and outputting a chip select signal to the RAM 14, and an I/O port (IOP) 162, used in write protection control of the backup RAM 14, for enable/disable-controlling the DEC 161.

An intelligent power supply (PS) 20 comprises a power control CPU for receiving a DC power supply voltage (+15 V) input from the power supply adapter or the expansion unit 2 to the power supply input terminal 5 as a primary power supply voltage, and for generating various internal operation power supply voltages (in this embodiment, +12 V, −12 V, −9 V, +5 V, and −5 V). In this embodiment, the internal operation power supply voltage of +5 V is output to the expansion unit 2 via the interface card 3 as an operation confirmation signal (SD). The intelligent power supply 20 will be referred to as a PC power supply circuit hereinafter. A pair of main batteries (B-A and B-B) 22A and 22B are independently detachable.

A printer (PRT) interface circuit 31 is interposed between the system bus 10 and a PRT connector C12, and exchanges data with a device connected to the PRT connector C12, such as a printer (PRT), an external floppy disk drive (FDD), or the like. The PRT interface circuit 31 comprises a PRT port (PRT-PORT) 311 for exchanging control signals and data with an external device such as a printer (PRT) connected to the PRT connector C12, an address decoder (DEC) 312 for detecting an address of the PRT-PORT 311, an I/O port (I/C-PORT) 313 for inputting data for controlling the port 311, an address decoder (DEC) 314 for detecting an address of the port 313, a control circuit 315 for receiving control data received by the I/O-PORT 313 and a chip select signal upon detection of the address by the DEC 312, and controlling the PRT-PORT 311, and the like.

A first RS-232C interface circuit 32A exchanges data between the system bus 10 and a serial I/O device connected to an RS-232C connector C13. The RS-232C interface circuit 32A comprises a serial I/O port (SIO) 321 and a driver (DRV) 322 for exchanging data with a device connected to the RS-232C connector C13, an address decoder (DEC) 323 for detecting an address of the SIO 321, an I/O port (I/O-PORT) 324 for receiving data for controlling the SIO 321, an address decoder (DEC) 325 for detecting an address of the port 324, a control circuit 326 for receiving control data received by the I/O-PORT 324 and a chip select signal upon detection of the address by the DEC 323, and controlling the SIO 321, and the like.

A second RS-232C interface circuit 32B exchanges data between the system bus 10 and a serial I/O device connected to an RS-232C connector C14. The RS-232C interface circuit 32B is also constituted by the same components as those in the first RS-232C interface circuit 32A described above.

Furthermore, this system comprises a programmable interval timer (PIT) 33, a keyboard controller (KBC) 34, a scan controller (SC) 35, a keyboard (KB) 36, a hard disk controller (HDC) 37, a hard disk drive (HDD) 38, a floppy disk controller (FDC) 39, a floppy disk drive (FDD) 40, a display controller (DISP-CNT) 41, a video RAM (VRAM) 42 supplied with a backup power supply voltage, and a display unit (DISP) 43. For the sake of simplicity, components such as a DMA controller for performing direct memory access, an interrupt controller, a timepiece module (Real-Time Clock), an expansion RAM, a RAM card slot, and the like are omitted from the drawings.

Figure 3:
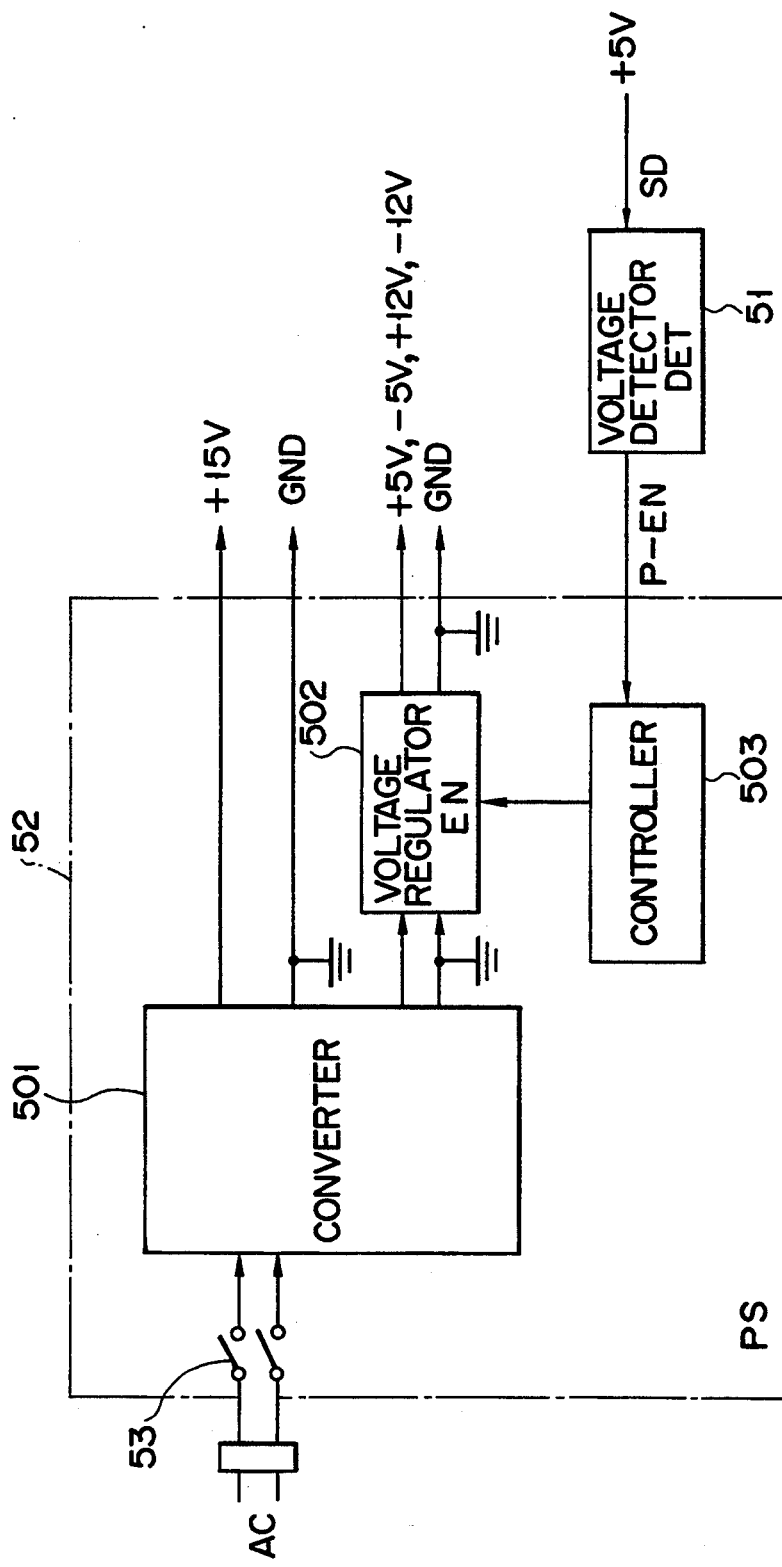
FIG. 3 is a block diagram showing an internal circuit arrangement of an intelligent power supply shown in FIG. 1.
Figure 5:
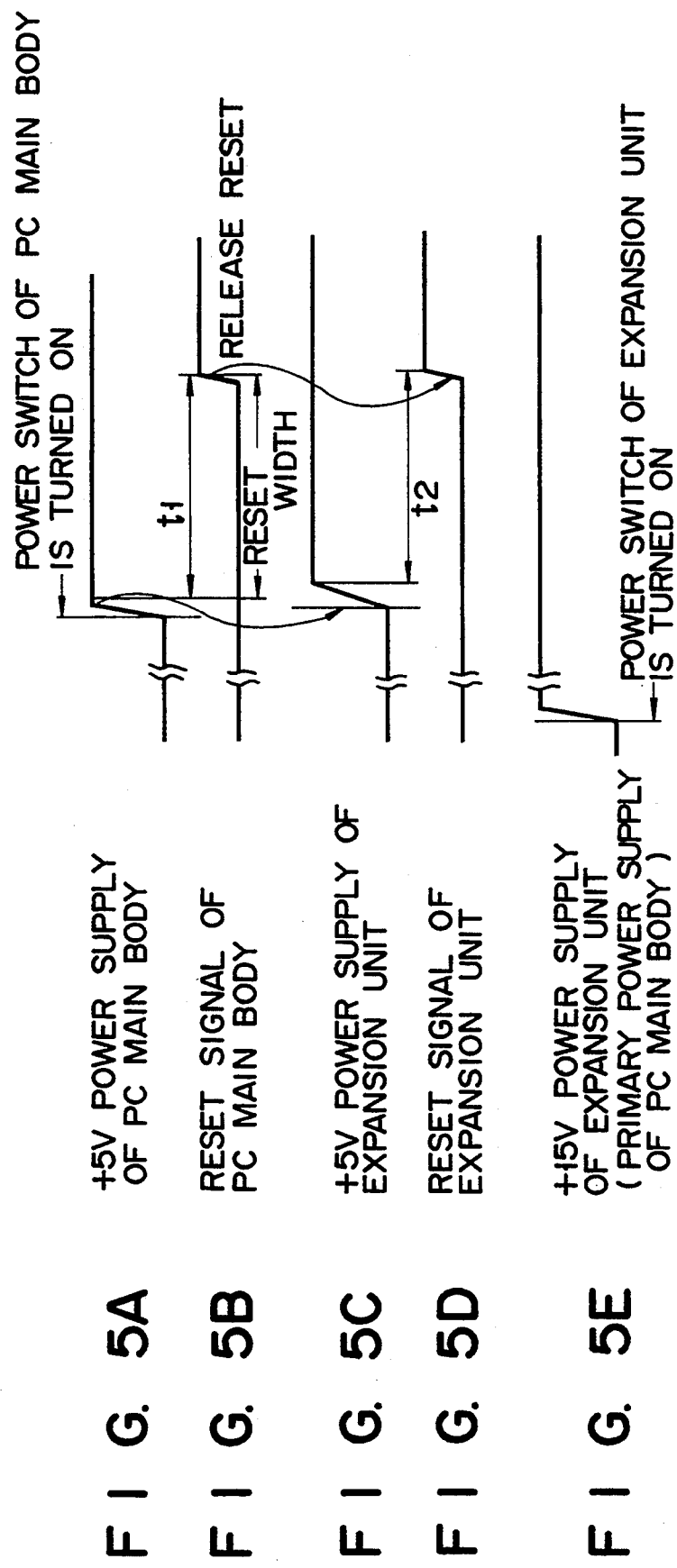
FIGS. 5A, 5B, 5C 5D and 5E are timing charts of the power-on sequence shown in FIG. 4.

The expansion unit 2 comprises components 50 through 55, 61, 62A, 62B, and C21 through C24. An expansion-side system bus 50 is connected to the system bus 10 of the PC main body 1 via the interface card 3. When a voltage detection circuit (DET) 51 receives an operation confirmation signal of +5 V from the PC power supply circuit 20 of the PC main body 1 via the interface card 3, it outputs a power supply enable signal (P-EN) upon detection of the signal. An intelligent power supply (PS) 52 has a power supply output control function of generating internal operation power supply voltages (in this embodiment, +12 V, −12 V, +5 V, and −5 V) for the expansion unit 2, and a primary power supply voltage (+15 V) for the PC main body 1, and inhibiting outputs of the power supply voltages (+12 V, −12 V, +5 V, and −5 V) in the unit until it receives the power supply enable signal (P-EN) from the voltage detection circuit 51. The power supply 52 will be referred to as a unit power supply circuit hereinafter, and its internal circuit arrangement is shown in FIG. 3. The unit power supply circuit 52 is connected to a power switch 53.

An ID register 54 is connected to the expansion-side system bus 50, and stores device identification data (to be referred to as unit ID data hereinafter) inherent to the expansion unit 2. For example, the ID register comprises a gate array for holding a value "DB(H)". An address decoder (DEC) 55 detects an address of the ID register 54.

Connectors C22, C23, and C24 are arranged in the expansion unit 2 in correspondence with the connectors C12, C13, and C14 of the PC main body 1. The PRT connector C22 serves as an alternative to the connector C12 provided to the PC main body 1. The RS-232C connectors C23 and C24 respectively serve as alternatives to the connectors C13 and C14 provided to the PC main body 1. In this embodiment, as shown in FIG. 9, when the expansion unit 2 is used, the PC main body 1 is docked on its rear surface side to the expansion unit 2. In this case, since the connectors C12, C13, and C14 are arranged on the rear surface portion of the PC main body 1, it is physically impossible to use the connectors C12, C13, and C14 of the PC main body 1 in the connected (docking) state. In order to avoid this inconvenience, when the PC main body 1 is docked to the expansion unit 2, the connectors C22, C23, and C24 of the expansion unit 2 are used in place of the connectors C12, C13, and C14 of the PC main body 1. Connector switching control processing in this case will be described in detail later with reference to FIG. 6.

An expansion-side PRT interface circuit 61, and first and second expansion-side RS-232C interface circuits 62A and 62B are arranged in correspondence with the expansion-side connectors C22, C23, and C24.

The expansion-side PRT interface circuit 61 is interposed between the expansion-side system bus 50 and the expansion-side PRT connector C22, and exchanges data with a device connected to the expansion-side PRT connector C22 in place of the PRT connector C12 of the PC main body 1. The PRT interface circuit 61 comprises a PRT port (PRT-PORT) 611 for exchanging control signals and data with an external device such as a printer (PRT) connected to the PRT connector C22, an address decoder (DEC) 612 for detecting an address of the port 611, an I/O port (I/O-PORT) 613 for receiving data for controlling the PRT-PORT 611, an address decoder (DEC) 614 for detecting an address of the port 613, a control circuit 615 for receiving control data received by the I/O-PORT 613 and a chip select signal upon detection of the address by the DEC 612, and controlling the PRT-PORT 611, and the like.

The first expansion-side RS-232C interface circuit 62A is interposed between the expansion-side system bus 50 and the expansion-side RS-232C connector C23, and exchanges data with a device connected to the expansion-side RS-232C connector C23 in place of the RS-232C connector C13 of the PC main body 1. The first expansion-side RS-232C interface circuit 62A comprises a serial I/O port (SIO) 621 and a driver (DRV) 622 for exchanging data with a device connected to the expansion-side RS-232C connector C23, an address decoder (DEC) 623 for detecting an address of the SIO 621, an I/O port (I/O-PORT) 624 for receiving data for controlling the SIO 621, an address decoder (DEC) 625 for detecting an address of the port 624, a control circuit 626 for receiving control data received by the I/O-PORT 624 and a chip select signal upon detection of the address by the DEC 623, and controlling the SIO 621.

The second expansion-side RS-232C interface circuit 62B is interposed between the expansion-side system bus 50 and the expansion-side RS-232C connector C24, and exchanges data with a device connected to the expansion-side RS-232C connector C24 in place of the RS-232C connector C14 of the PC main body 1. The second expansion-side RS-232C interface circuit 62B is constituted by the same components as the first expansion-side RS-232C interface circuit 62A described above. Note that the addresses of the respective I/O ports (the PRT-PORT 611, and the SIOs 621) of the expansion unit 2 are the same as those of the I/O ports (the PRT-PORT 311 and the SIOs 321) of the PC main body 1. In this case, however, the DEC 614 and the DECs 625 for the I/O port (I/O-PORT) 613 and the I/O-PORTs 624 of the interface circuits 61, 62A, and 62B of the expansion unit 2 have detection address values different from those of the DEC 314 and the DECs 325 for the I/O-PORT 313 and the I/O-PORTs 324 of the interface circuits 31, 32A, and 32B of the PC main body 1, and have inherent address detection functions. In the buses 10, 17, and 50, reference symbol A denotes an address bus; D, a data bus; and C, a control bus.

FIG. 2 is a block diagram showing an internal circuit arrangement of the interface card 3 connected to the expansion bus connector C11 of the PC main body 1 when the expansion unit 2 is used.

The interface card 3 is located between the system buses (10 and 50) of the PC main body 1 and the expansion unit 2. Bus drivers inserted in a transfer path from the PC main body 1 to the expansion unit 2 receive an operation power supply voltage (+5 V) from the expansion unit 2 as a data receiver, and bus drivers inserted in a data transfer path from the expansion unit 2 to the PC main body 1 receive an operation power supply voltage (+5 V) from the PC main body 1 as a data receiver.

More specifically, in FIG. 2, bus drivers 301A, 302A, 303A, and 304A receive an operation power supply voltage (+5 V) from the expansion unit 2. The bus driver 301A transfers an address on the address bus A included in the system bus 10 of the PC main body 1 to the address bus A included in the system bus 50 of the expansion unit 2. The bus driver 302A similarly transfers data on the data bus D included in the system bus 10 to the data bus D included in the system bus 50. The bus drivers 303A and 304A similarly transfer control data on the control bus C included in the system bus 10 to the control bus C included in the system bus 50. Bus drivers 301B, 302B, 303B, and 304B receive an operation power supply voltage (+5 V) from the PC main body 1. The bus driver 301B transfers an address on the address bus A included in the system bus 50 of the expansion unit 2 to the address bus A included in the system bus 10 of the PC main body 1. The bus driver 302B similarly transfers data on the data bus D included in the system bus 50 to the data bus D included in the system bus 10. The bus drivers 303B and 304B similarly transfer control data on the control bus C included in the system bus 50 to the control bus C included in the system bus 10. A control circuit 305 controls driving operations of the bus drivers 301A through 303A, and 301B through 303B. That is, the control circuit 305 detects data transfer states on the bus, and enables the bus drivers 301A through 303A, and 301B through 303B.

FIG. 3 is a block diagram showing an internal circuit arrangement of the unit power supply circuit 52. In FIG. 3, a converter 501 has a rectifying/smoothing circuit, and rectifies/smooths a commercial AC power supply voltage (AC), thereby generating internal operation DC power supply voltages (+12 V, −12 V, +5 V, and −5 V) of the expansion unit 2, and a primary power supply voltage (+15 V) for the PC main body 1. A voltage regulator 502 stably outputs the internal operation DC power supply voltages (+12 V, −12 V, +5 V, and −5 V) obtained by the converter 501. A controller 503 receives a power supply enable signal (P-EN) output from the voltage detection circuit 51, and controls power supply voltage outputs of the voltage regulator 502. When the voltage regulator 502 receives an operation confirmation signal (SD) of +5 V from the PC power supply circuit 20 of the PC main body 1 via the interface card 3, the controller 503 enables the voltage regulator 502 to supply the operation power supply voltages (+12 V, −12 V, +5 V, and −5 V) obtained by the converter 502 to the internal circuits.

FIG. 4 shows a power-on sequence of this embodiment when the expansion unit 2 is used, and FIGS. 5A through 5E are timing charts of this sequence. In this sequence, the expansion unit 2 supplies operation power supply voltages to the respective circuits in the unit only when it confirms that the PC main body 1 is in an operation enable state upon reception of an operation confirmation signal (SD) from the PC main body 1. More specifically, the expansion unit 2 outputs operation power supply voltages (+12 V, −12 V, +5 V, and −5 V) of its own unit to the respective circuits in the unit reception of the operation confirmation signal of +5 V from the PC power supply circuit 20 of the PC main body 1. In this case, the expansion unit 2 releases a reset state at a reset release timing of the PC main body 1. In FIG. 4, reference symbol t1 denotes a reset period of the PC main body 1; and t2, a reset period of the expansion unit 2.

Turning now to the specific steps illustrated in FIG. 4, when the user turns on the power switch in step ST1, the power supply of the expansion unit outputs 15 volts in step ST2. This can be seen in timing diagram FIG. 5E. In step ST3, the power switch of the main body is turned on and the 5 volt power supply of the PC main body outputs 5 volts as illustrated in step ST4 and in timing diagram FIG. 5A. Step ST5 receives the 5 volt power output from the main body as a confirmation signal (SD) and step ST5 outputs a power supply enable signal. Step ST6 then starts the voltage regulator and step ST7 outputs the internal operation power for the expansion unit. Also, step ST9 outputs the internal operation power for the PC main body. In step ST8, after a predetermined period of time (t2) after the 5 volt power supply of the expansion unit is turned on is released. In a similar manner, in step ST10, a reset signal of the PC main body is released after a predetermined period of time (t1) after the 5 volt power supply of the PC main body is turned on.

Figure 7:
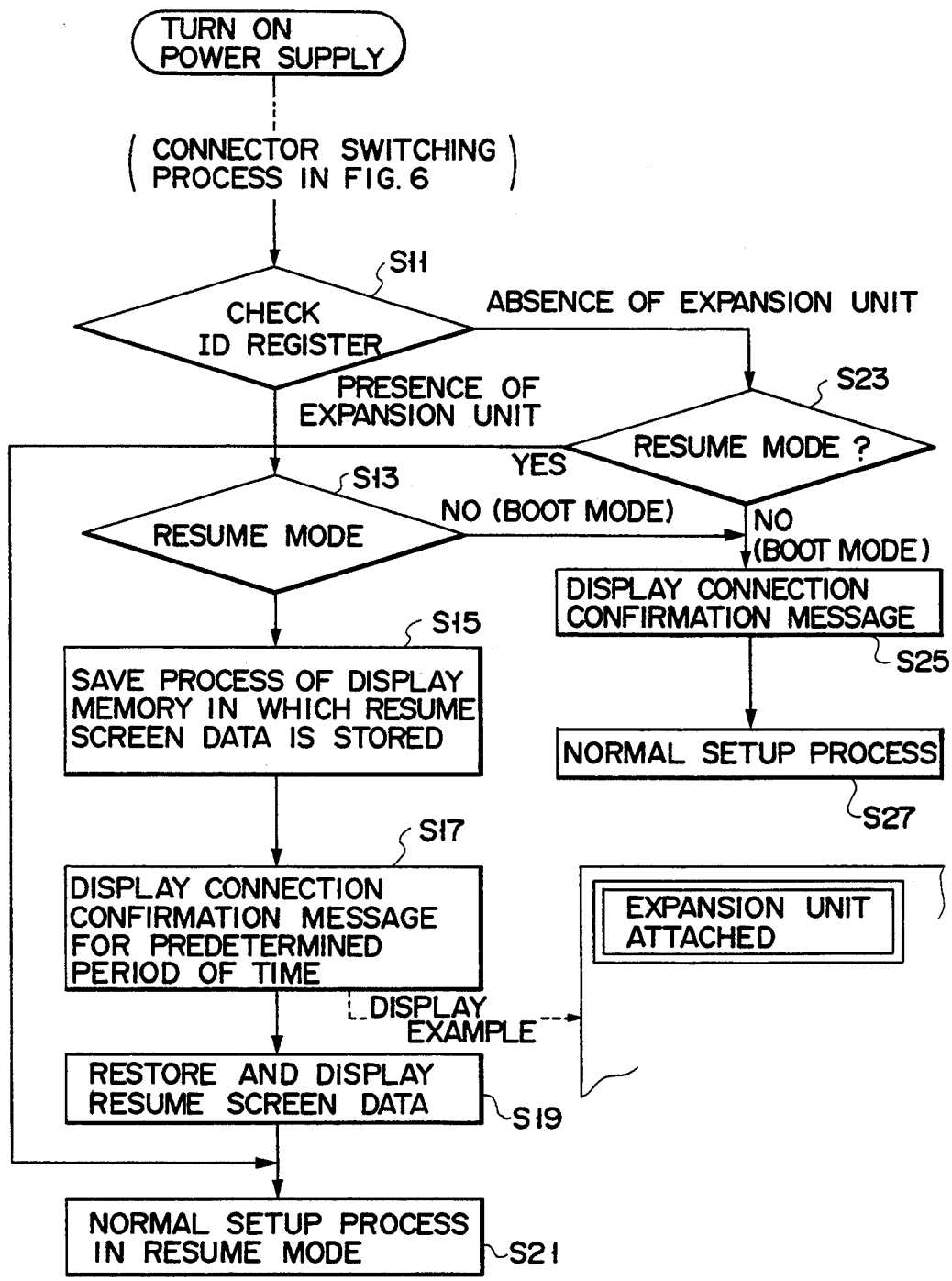
FIG. 7 is a flow chart of an expansion unit connection state display processing routine executed after the connector switching processing routine.

FIG. 6 is a flow chart showing an operation processing flow of the connector switching processing routine RT-B executed when the power switch of the PC main body 1 is turned on. FIG. 7 is a flow chart showing an operation processing flow of the external device connection state display processing routine RT-A executed after the connector switching processing routine RT-B.

In the connector switching processing shown in FIG. 6, when the expansion unit 2 is used, the connectors C12, C13, and C14 of the PC main body 1 are replaced with the expansion-side connectors C22, C23, and C24 of the expansion unit 2. More specifically, when the expansion unit 2 is connected to the PC main body 1, the connectors C12, C13, and C14 of the PC main body 1 are disabled (i.e., set in an unusable state), thus avoiding an inconvenience that the PRT connector C12, and the RS-232C connectors C13 and C14 of the PC main body 1 cannot be physically used. In FIG. 6, when the power switch is turned on, the PC main body 1 executes the connector switching processing routine RT-B after an elapse of a predetermined reset period, and accesses the ID register 54 in the expansion unit 2 to determine the presence/absence of connection of the expansion unit 2. If it is determined that the expansion unit 2 is connected, control data for inhibiting supply of a chip select signal to the PRT-PORT 311, and the SIOs 321 are set in the I/O-PORT 313 and I/O-PORTs 324 of the interface circuits 31, 32A, and 32B, thereby disabling the ports 311 and 321, and control data for permitting supply of a chip select signal to the PRT-PORT 611 and the SIOs 621 are set in the I/O-PORT 613 and the I/O-PORTs 624 of the interface circuits 62A, and 62B of the expansion unit 2, thereby enabling the port 611, and the ports 621. In this manner, the PRT connector C12, and the RS-232C connectors C13 and C14 of the PC main body 1 are set in a circuit disconnection (operation disable) state, and alternatively, the PRT connector C22, and the RS-232C connectors C23 and C24 of the expansion unit 2 are set in a circuit connection (operation enable) state. In this case, the ID register 54 reads ID data at a read timing shown in FIGS. 8A through 8D. If it is determined that no expansion unit 2 is connected, the PC main body 1 accesses the I/O ports of the PC-side interfaces (61, 62A, and 62B) to enable the PRT-PORT 311 and the SIOs 321.

In the external device connection state display processing shown in FIG. 7, a connection presence/absence state of the expansion unit 2 can be displayed even when the PC main body 1 is set in the resume mode. More specifically, when the PC main body 1 is set in the resume mode, execution of an application program is continued from a state immediately before the power switch was turned off when the power switch 21 is turned on. Therefore, an operator cannot recognize whether or not the expansion unit 2 is set in a connection state when the power switch is turned on. In this embodiment, when the power switch is turned on in the resume mode, the ID register 54 in the expansion unit 2 is accessed upon execution of the external device connection state display processing routine RT-A to determine the presence/absence of connection of the expansion unit 2, and a connection presence/absence state of the expansion unit 2 is displayed to be enclosed in a double-line frame on a specific display area on a display screen for a predetermined period of time in accordance with the determination result. In this case, resume screen data in the specific display area are saved beforehand, and after the connection presence/absence state is displayed, the saved content is displayed to display the original resume screen data.

FIGS. 8A through 8D are timing charts showing a read timing of ID data (ID fixed value) of the ID register 54. In FIG. 8A, the CPU 11 sends an address of the ID register 54 onto the address bus A, and outputs ID data (ID fixed value) onto the data bus D, as shown in FIG. 8D, in synchronism with a chip select signal (CS) shown in FIG. 8B and an IO read signal (IOR) shown in FIG. 8C.

Figure 9A:
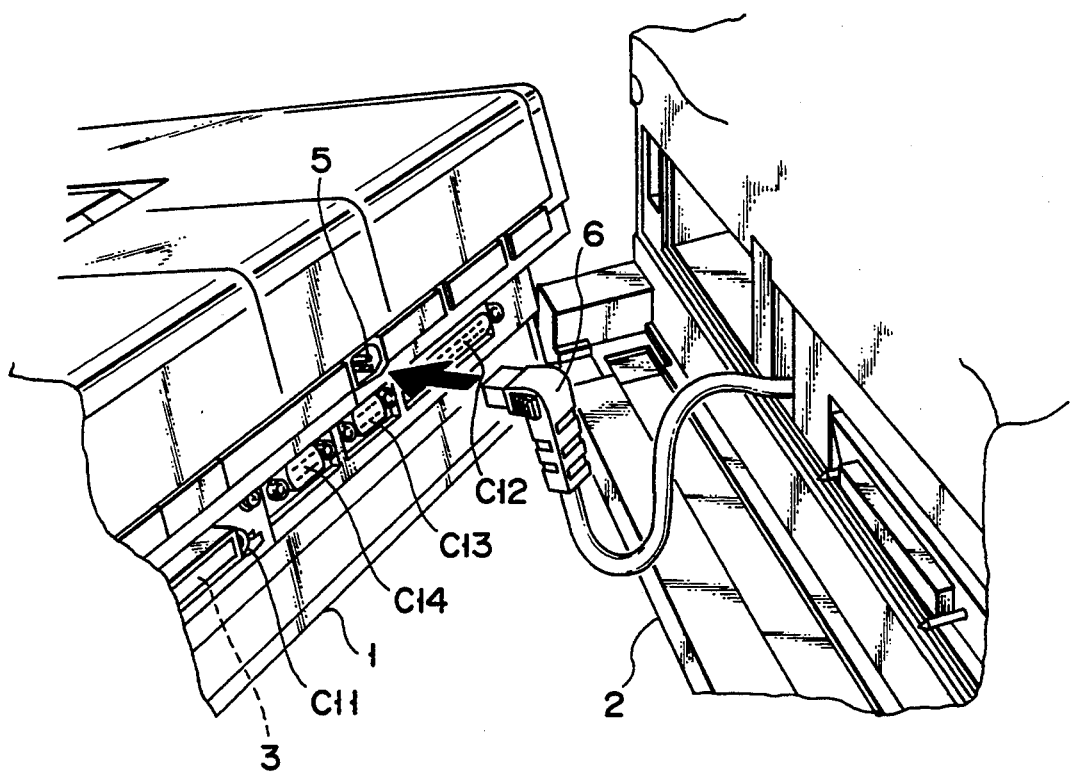

FIGS. 9A through 9C are perspective views showing outer appearances of the PC main body 1 and the expansion unit 2 of this embodiment. In this embodiment, when the PC main body 1 is docked to the expansion unit 2, and is bus-connected thereto via the interface card 3 connected to the expansion bus connector C11, it is physically impossible to use the PRT connector C12, and the RS-232C connectors C13 and C14.

The operations of the embodiment of the present invention will be described below with reference to FIGS. 1A through 9C. When the PC main body 1 is connected to the expansion unit 2, the interface card 3 is connected to the expansion bus connector C11 of the PC main body 1, and the PC main body 1 is bus-connected to the expansion unit 2 via the interface card 3. In this case, the DC power supply (+15 V) output terminal of the expansion unit 2 is plug-in connected to the power supply input terminal 5 of the PC main body 1. FIGS. 9A through 9C show a connection state and a docking state in this case. In this docking state, it is physically impossible to use the PRT connector C12 and the RS-232C connectors C13 and C14 of the PC main body 1.

The power-on sequence when the PC main body 1 is connected to the expansion unit 2 will be described below with reference to FIGS. 1A through 5E.

When the power switch 53 of the PC main body 1 is turned on while the PC main body 1 is connected to the expansion unit 2, the unit power supply circuit 52 generates internal operation power supply voltages (+12 V, −12 V, +5 V, and −5 V) for the expansion unit 2, and a primary power supply voltage (+15 V) for the PC main body 1. In this case, the voltage regulator 502 or the controller 503 of the unit power supply circuit 52 has not received the power supply enable signal (P-EN) yet, and is kept disabled. Therefore, the circuit 52 does not output stable internal operation power supply voltages (+12 V, −12 V, +5 V, and −5 V) yet.

The primary power supply voltage (+15 V) for the PC main body 1 output from the unit power supply circuit 52 is input to the power supply input terminal 5 of the PC main body 1 via the PC power supply output plug 6, and is supplied to the PC power supply circuit 20.

In this case, if the power switch 21 of the PC main body 1 is kept ON, the PC power supply circuit 2C generates internal operation stabilization DC power supply voltages (+12 V, −12 V, −5 V) on the basis of the DC primary power supply voltage (+15 V) input via the power supply input terminal 5.

The DC power supply voltages (+12 V, −12 V, −9 V, +5 V, and −5 V) generated by the PC power supply circuit 20 are supplied to the internal circuits, and the power supply voltage of +5 V is supplied to the interface card 3 via the expansion bus connector C11.

The power supply voltage of +5 V supplied from the PC power supply circuit 20 to the interface card 3 are supplied to the bus drivers 301B, 302B, 303B, and 304B which form the data transfer paths from the expansion unit 2 to the PC main body 1, as shown in FIG. 2, as an operation power supply voltage, and is also supplied to the voltage detection circuit 51 in the expansion unit 2 via the interface card 3 as an operation confirmation signal (SD).

In this manner, in the interface card 3, the bus drivers 301B, 302B, 303B, and 304B which form the data transfer paths from the expansion unit 2 to the PC main body 1 are enabled upon reception of the power supply voltage of +5 V from the PC power supply circuit 20. However, the bus drivers 301A, 302A, 303A, and 304A which form the data transfer paths from the PC main body 1 to the expansion unit 2 are not enabled yet. Therefore, the power supply voltage from the PC main body 1 in a power-on state can be prevented from being supplied to the expansion unit 2 via the interface card 3.

When the voltage detection circuit 51 in the expansion unit 2 receives the power supply voltage of 5 V from the PC power supply circuit 20 as the operation confirmation signal (SD) of the PC main body 1, it supplies the power supply enable signal (P-EN) to the unit power supply circuit 52 upon detection of the signal SD.

Upon reception of the power supply enable signal (P-EN) from the voltage detection circuit 51, the unit power supply circuit 52 outputs stabilized internal operation voltages (+12 V, −12 V, +5 V, and −5 V). More specifically, as shown in FIG. 3, the voltage regulator 502 in the unit power supply circuit 52 is enabled upon reception of the power supply enable signal (P-EN) via the controller 503, and supplies stabilized internal operation voltages (+12 V, −12 V, +5 V, and −5 V) to the internal circuits.

In this manner, the expansion unit 2 supplies operation power supply voltages (+12 V, −12 V, +5 V, and −5 V) to its internal circuits after it receives the operation confirmation signal (SD) of +5 V from the PC power supply circuit 20 of the PC main body 1 via the interface card 3. With this power-on sequence, the power-on order is clarified in the system, and power supplies can always be turned on in the normal power-on order. Therefore, an erroneous operation, damage to hardware, and the like caused by a wrong power-on order can be prevented.

When the power switch 21 is kept OFF while the DC primary power supply voltage (+15 V) is supplied to the power supply circuit 20 of the PC main body 1, the mounted main batteries 22A and 22B are charged.

The connector switching processing operation will be described below with reference to the flow chart shown in FIG. 6.

As described above, the PC main body 1 is docked on its rear surface side to the expansion unit 2, as shown in FIGS. 9A through 9C. In this case, since the connectors C12, C13, and C14 are arranged on the rear surface portion of the PC main body 1, it is physically impossible to use the connectors C12, C13, and C14 of the PC main body 1 in the docking state. In order to avoid this inconvenience, when the PC main body L is docked to the expansion unit 2, the connectors C22, C23, and C24 of the expansion unit 2 are used in place of the connectors C12, C13, and C14 of the PC main body 1.

When both the PC main body 1 and the expansion unit 2 are enabled in the power-on sequence described above, the PC main body 1 executes the connector switching processing routine RT-B stored in the ROM 12 after an elapse of a reset period (t2) shown in FIG. 4 and FIGS. 5A through 5E, and performs connector switching processing in a sequence shown in FIG. 6.

In the connector switching processing, the connectors C12, C13, and C14 of the PC main body 1 are replaced with the expansion-side connectors C22, C23, and C24 of the expansion unit 2. More specifically, the connectors C12, C13, and C14 of the PC main body 1 are disabled (set in an unusable state) in step S3, and the expansion-side connectors C22, C23, and C24 of the expansion unit 2 are enabled (set in a usable state) in step S5, thus avoiding an inconvenience that the PRT connector C12, and the RS-232C connectors C13 and C14 of the PC main body 1 cannot be physically used.

The PC main body 1 executes the connector switching processing routine RT-B after an elapse of a predetermined reset period (FIG. 5B) upon a power-on operation in the above-mentioned power-on sequence, and checks if the ID fixed value ("DB(H)") in the ID register 54 in the expansion unit 2 is normally read. If the ID fixed value is normally read, it is determined that the expansion unit 2 is connected.

If it is determined that the expansion unit 2 is connected, control data for inhibiting supply of a chip select signal to the PRT-PORT 311, and the SIOs 321 are set in the I/O-PORT 313 and I/O-PORTs 324 of the circuit 315 and the control circuits 326 respectively disable the corresponding PRT-PORT 311 and SIOs 321 according to the control data, thereby setting the PRT connector C12, and the RS-232C connectors C13 and C14 in an unusable state (step S3 in FIG. 6).

Then, control data for permitting supply of a chip select signal to the PRT-PORT 611 and the SIOs 621 are set in the I/O-PORT 613 and the I/O-PORTs 624 of the interface circuits 61, 62A, and 62B of the expansion unit 2, and the control circuit 615 and the control circuits 626 respectively enable the corresponding PRT-PORT 611 and SIOs 621 in accordance with the control data, thereby setting the PRT connector C22 and the RS-232C connectors C23 and C24 in a usable state in place of the PRT connector C12 and the RS-232C connectors C13 and C14 of the PC main body 1 (step S5 in FIG. 6).

If it is determined as a result of access to the ID register 54 in the expansion unit 2 that no expansion unit 2 is connected (step S1 in FIG. 6), control data for permitting supply of a chip select signal to the PRT-PORT 311, and the SIOs 321 are set in the I/O-PORT 313 and I/O-PORTs 324 of the interface circuits 31, 32A, and 32B of the PC main body 1, and the control circuit 315 and the control circuits 326 respectively enable the corresponding PRT-PORT 311 and SIOs 321 in accordance with the control data, thus setting the PRT connector C12 and the RS-232C connectors C13 and C14 of the PC main body 1 in a usable state (step S7 in FIG. 6).

In this manner, when the expansion unit 2 is connected to the PC main body 1, the connectors C12. C13, and C14 of the PC main body 1 are set in a disable state (unusable state), and alternatively, the expansion-side connectors C22, C23, and C24 of the expansion unit 2 are set in an enable state, so that the connectors C22, C23, and C24 of the expansion unit 2 serve as the alternatives to the connectors C12, C13, and C14 of the PC main body 1. As a result, an inconvenience that the PRT connector C12 and the RS-232C connectors C13 and C14 of the PC main body 1 cannot be physically used can be prevented.

The external device connection state display processing according to the external device connection state display processing routine RT-A will be described below with reference to the flow chart shown in FIG. 7. The external device connection state display processing routine RT-A is executed after the connector switching processing in start processing executed when the power switch of the PC main body 1 is turned on. As a result, even when the PC main body 1 is set in the resume mode, a connection presence/absence state of the expansion unit 2 can be displayed.

When the PC main body 1 is in the resume mode, execution of an application program is continued from a state immediately before the power switch was turned off when the power switch 21 is turned on. Therefore, an operator cannot recognize whether or not the expansion unit 2 is set in a connection state when the power switch is turned on. According to the present invention, when the power switch is turned on in the resume mode, the connection presence/absence state of the expansion unit 2 is displayed on the display screen of the DISP 43 for a predetermined period of time in a display format (in a double-line frame) which can be distinguished from display data displayed when the computer is started by the resume processing.

The PC main body 1 executes the connector switching processing routine RT-B after an elapse of a predetermined reset period (FIG. 5B), and then, executes the external device connection state display processing routine RT-A when the power supplies are turned on in the power-on sequence. In this processing, whether or not the expansion unit 2 is connected is checked (step S11 in FIG. 7), and then, whether or not the resume mode is set is checked (step S13 or S23 in FIG. 7).

If it is determined in step S11 that the expansion unit 2 is connected to the PC main body 1, and it is determined in step S13 that no resume mode is set, the CPU 11 displays a message indicating that the expansion unit 2 is connected on the DISP 43 in step S25.

On the other hand, if it is determined that the expansion unit 2 is connected, and the resume mode is set, the CPU 11 executes display memory save processing. More specifically, resume screen data corresponding to a portion where the message indicating that the expansion unit 2 is connected is displayed are saved (step S15 in FIG. 7).

In this processing, the IOP 162 for the backup RAM write protection control provided to the M-CNT 16 is accessed to cancel the write protection of the backup RAM 14 (more specifically, the DEC 161 is enabled to output a chip select signal to the RAM 14 when the backup RAM is addressed, thus allowing write access to the RAM 14). Then, the contents of registers of the DISP-CNT 41 are saved in the backup RAM 14, and a mode for displaying a connection confirmation message is set in a display mode register in the DISP-CNT 41. Thereafter, data of an area on the VRAM 42 where the connection confirmation message is to be displayed are saved in the backup RAM 14.

Then, processing for displaying the connection confirmation message for a predetermined period of time is executed (step S17 in FIG. 7).

In this processing, the connection confirmation message according to display data stored in the ROM 12 are developed on the connection confirmation message display area allocated on the VRAM 42, and are displayed on the display screen of the DISP 43. In this case, the connection confirmation message is surrounded by a double-line frame like in a display example corresponding to step S17 in FIG. 7, and is displayed on a predetermined area on the display screen of the DISP 43 in a display format which can be distinguished from display data displayed when the computer is started by the resume processing. In this case, when the connection confirmation message is displayed, the PIT 33 is started. As a result, a display period of the connection confirmation message is monitored by the PIT 33, so that the connection confirmation message can be displayed for a predetermined period of time.

After the connection confirmation message is displayed for a predetermined period of time, processing for restoring the display screen in the resume mode is executed (step S19 in FIG. 7).

In this processing, the display data saved in the backup RAM 14 are restored to the VRAM 42, the contents of the registers of the DISP-CNT 41 saved in the backup RAM are restored to the DISP-CNT 41, and the backup RAM 14 is set in a write protection state.

With the above-mentioned display confirmation message display processing, the connection state of the expansion unit 2 can be recognized to be distinguished from resume display data displayed when the computer is started in the resume mode.

FIG. 10 is a block diagram showing another embodiment of the present invention. In the above embodiment, a message indicating that the expansion unit 2 is connected is displayed on the DISP 43 of the PC main body. However, in the embodiment shown in FIG. 10, an LED driver 73 and an LED 71 are arranged in the expansion unit 2, and when the expansion unit 2 is connected, the LED 71 is turned on.

In the above embodiment, in the start processing executed when the power switch is turned on, the connector switching processing routine RT-B is executed, and then, the external device connection state display processing routine RT-A is executed. However, the present invention is not limited to this processing order. The numbers of interface circuits, and alternative connectors are not limited to those in the above embodiment, but another arrangement may be employed.

The present invention has exemplified only an expansion unit. However, the present invention is not limited to this, but may be applied to an external expansion hard disk drive, a floppy disk drive, a communication unit, or the like.

In the embodiment shown in FIG. 10, the LED is arranged in the expansion unit 2. However, the LED may be arranged in the PC main body 1.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A connection state confirming system for an expansion unit connected to a portable computer having a memory, a display unit and a resume function, comprising:

storage means, provided in the expansion unit, for storing specific data representing if the expansion unit is connected to the portable computer;

means, provided in the portable computer, for reading the specific data from the storage means;

means, provided in the portable computer, for determining if the resume function is enabled and if the expansion unit is connected to the portable computer using the read-out specific data;

means for saving resume data being displayed on a specific resume screen area of the display unit into the memory when the determining means determines that the expansion unit is connected to the portable computer and the resume function is enabled;

means for displaying, for a predetermined period of time, the specific data in the specific area of the display unit; and means for reading the saved resume data and displaying the read saved resume data on the specific area of the display unit after the predetermined period of time has elapsed.

2. A system according to claim 1, wherein said display unit includes any one or combination of a CRT display unit, a liquid crystal display unit, and a plasma display unit.

3. A system according to claim 1, wherein the specific data displayed by the means for displaying represents that the expansion unit is connected to the portable computer.

4. A connection state confirming system for an expansion unit having a display element and connected to a portable computer having a memory, a display unit, and a resume function, comprising:

storage means, provided in the expansion unit, for storing specific data representing if the expansion unit is connected to the portable computer;

means, provided in the portable computer, for reading the specific data from the storage means;

means, provided in the portable computer, for determining if the resume function is enabled and if the expansion unit is connected to the portable computer using the read-out specific data;

means for saving resume data being displayed on a specific resume screen area of the display unit into the memory when the determining means determines that the expansion unit is connected to the portable computer and the resume function is enabled; and means for displaying a specific message in a display element provided in the expansion unit.

5. A system according to claim 4, wherein said display element comprises a light emitting diode and the specific message is that said expansion unit is connected to the portable computer.

6. A system according to claim 4, wherein said means for displaying a specific message displays, for a predetermined period of time, a message indicating the expansion unit is connected to the portable computer.

7. A connection state confirming method for an expansion unit connected to a portable computer having a memory, a display unit, and a resume function, the method comprising the computer steps of:

a) reading specific data representing if the expansion unit is connected to the portable computer stored in a register provided in the expansion unit;

b) determining if the resume function is enabled and determining if the expansion unit is connected to the portable computer using the read-out specific data;

c) saving resume data being displayed on a specific resume screen area of the display unit into the memory when the determining step determines that the expansion unit is connected to the portable computer and the resume function is enabled;

d) displaying, for a predetermined period of time, a specific message in the specific area of the display unit; and e) reading and displaying the saved resume data on the specific area of the display unit after the predetermined period of time has elapsed.

8. A method according to claim 7, wherein the display unit includes any one or combination of a CRT display unit, a liquid crystal display unit, and a plasma display unit.

9. A method according to claim 7, wherein said displaying step displays the specific message which indicates the portable computer is connected to the expansion unit.

10. A connection state confirming method for an expansion unit provided with a display element and connected to a portable computer provided with a memory, a display unit, and a resume function, the method comprising the computer steps of:

a) reading specific data representing if the expansion unit is connected to the portable computer stored in a register provided in the expansion unit;

b) determining if the resume function is enabled and determining if the expansion unit is connected to the portable computer using the read-out specific data;

c) saving resume data being displayed on a specific resume screen area of the display unit into the memory when the determining step determines that the expansion unit is connected to the portable computer and the resume function is enabled; and d) displaying a specific message in a display element provided in the expansion unit.

11. A method according to claim 8, wherein said step of displaying illuminates a light emitting diode which is the display element and the specific message indicates connection of said expansion unit to the portable computer.

12. A method according to claim 10, wherein said displaying step displays the specific message which indicates the portable computer is connected to the expansion unit.

13. A connection state confirming method, comprising the computer implemented steps of:

determining if a resume function of a portable computer is set;

saving data being displayed, upon a power-down of the portable computer, when the determining step determines that the resume function is set;

determining if the portable computer is connected to an expansion unit upon power-up of the portable computer;

displaying, for a predetermined period of time, a message indicating the portable computer is connected to the expansion unit, upon power-up of the computer, when the step of determining if the portable computer is connected to the expansion unit determines that the portable computer is connected to the expansion unit;

displaying the saved data which was being displayed, after the predetermined period of time for displaying said message has elapsed.

14. A method according to claim 13, wherein:

said step of determining if the portable computer is connected to the expansion unit determines if the portable computer is connected to the expansion unit by reading a register in the expansion unit.

15. A method according to claim 13, further comprising the step of, performed upon the power-up:

enabling peripheral connectors of the expansion unit and disabling peripheral connectors of the portable computer, when said step of determining if the portable computer is connected to the expansion unit determines that said portable computer is connected to the expansion unit.

16. A method according to claim 13, wherein said expansion unit is a docking station for the portable computer and said step of determining if the portable computer is connected to an expansion unit determines if the portable computer is connected to the docking station.

17. A connection state confirming apparatus, comprising:

first determining means for determining if a resume function of a portable computer is set;

means for saving data being displayed upon a power-down of the portable computer when the first determining means determines that the resume function is set;

second determining means for determining if the portable computer is connected to an expansion unit upon power-up of the portable computer;

means for displaying, for a predetermined period of time, a message indicating the portable computer is connected to the expansion unit upon power-up of the computer, when the second determining means determines that the portable computer is connected to the expansion unit;

means for displaying the saved data which was being displayed, after the predetermined period of time for displaying said message has elapsed.

18. An apparatus according to claim 17, wherein:

said first determining means for determining if the portable computer is connected to the expansion unit determines if the portable computer is connected to the expansion unit by reading a register in the expansion unit.

19. An apparatus according to claim 17, further comprising:

means for enabling peripheral connectors of the expansion unit and disabling peripheral connectors of the portable computer, when said second determining means determines that said portable computer is connected to the expansion unit.

20. An apparatus according to claim 17, wherein: said expansion unit is a docking station for the portable computer.

21. A method of starting a computer, comprising the steps of:

determining if a resume mode is set in the computer;

determining if the computer is connected to an expansion unit;

saving at least a portion of screen data which is at a predetermined position where a connection confirmation message will be displayed, when the resume mode is determine to be set and the computer is determined to be connected to the expansion unit;

displaying a connection confirmation message, after the saving step, for a predetermined period of time when the resume mode is determine to be set and the computer is determined to be connected to the expansion unit;

restoring, after the displaying step, said at least a portion of saved screen data at the predetermined position after the connection confirmation message has been displayed for a predetermined period of time when the resume mode is determine to be set and the computer is determined to be connected to the expansion unit;

starting the computer using a resume function, when the resume mode is determined to be set; and starting the computer without using the resume function, when the resume mode is determined not to be set.

22. An apparatus for starting a computer, comprising:

means for determining if a resume mode is set in the computer;

means for determining if the computer is connected to an expansion unit;

means for saving at least a portion of screen data which is at a predetermined position where a connection confirmation message will be displayed, when the resume mode is determine to be set and the computer is determined to be connected to the expansion unit;

means for displaying a connection confirmation message for a predetermined period of time when the resume mode is determine to be set and the computer is determined to be connected to the expansion unit;

means for restoring said at least a portion of saved screen data at the predetermined position after the connection confirmation message has been displayed for a predetermined period of time when the resume mode is determine to be set and the computer is determined to be connected to the expansion unit;

means for starting the computer using a resume function, when the resume mode is determined to be set; and means for starting the computer without using the resume function, when the resume mode is determined not to be set.

* * * * *